United States Patent [19]

Stenger

[11] 3,839,897
[45] Oct. 8, 1974

[54] APPARATUS FOR TESTING TRACTION COEFFICIENT

[75] Inventor: Richard J. Stenger, Wilmington, Del.

[73] Assignee: Sun Research and Development Co., Philadelphia, Pa.

[22] Filed: Jan. 2, 1973

[21] Appl. No.: 320,357

[52] U.S. Cl. .................................... 73/10, 73/59
[51] Int. Cl. ........................................ G01n 19/02
[58] Field of Search .......... 73/9, 10, 59, 58; 74/200, 74/25

[56] References Cited
UNITED STATES PATENTS

| 2,045,555 | 6/1936 | Almen | 73/10 |
| 2,957,335 | 10/1960 | Dmitroff | 73/10 |
| 3,145,558 | 8/1964 | Borrino | 73/10 |
| 3,166,927 | 1/1965 | Sonntag et al. | 73/10 |
| 3,272,021 | 9/1966 | Weber | 74/25 |
| 3,440,894 | 4/1969 | Hammann et al. | 74/200 |
| 3,475,972 | 11/1969 | Steibel | 74/25 |
| 3,717,025 | 2/1973 | Kronenberg et al. | 73/9 |

Primary Examiner—Richard C. Queisser
Assistant Examiner—Daniel M. Yasich
Attorney, Agent, or Firm—George L. Church; J. Edward Hess; Stanford J. Hetzel

[57] ABSTRACT

An apparatus for testing fluids for coefficient of traction between two rotating surfaces by measuring the thrust force at slip developed by a linear actuator due to traction between actuator drive shaft and rollers driven thereby.

3 Claims, 3 Drawing Figures

\* VALUES @ 1000 ft./min., 200°F., 500,000 psi AS REPORTED BY DULING et al. IN US 3,608,385, SEPTEMBER 28, 1971.

\*\* FOR 10° PITCH, 250,000 psi, 660 RPM SHAFT SPEED

APPARATUS FOR TESTING TRACTION COEFFICIENT

BACKGROUND OF THE INVENTION

Manufacturers of tractive power transmissions have long realized the need for lubricants having high dynamic coefficient of traction and which are non-corrosive and are sufficiently stable to retain those properties under severe stress to which such fluids are subjected during use. Concurrent with the needs for such fluids was a need to test tractive fluids under practical operating conditions.

A tractive device, which converts rotational movement into linear movement, in simplest form, could consist of two parallel cylindrical rollers, in tangential contact, one roller being the input member and the other the output member. The thrust force developed by such rotational contact is a direct function of contact pressure between the rollers, angular relationship between rolling elements and traction properties of fluid at rolling surfaces. The term coefficient of traction is preferred over coefficient of friction to connote rolling contact. Although tractive elements appear to be in contact, it is generally accepted that a fluid film is provided therebetween. Essentially all tractive drives require a fluid to remove heat and to prevent wear at the contact surfaces. It is well established that the nature of this fluid has a profound effect on the performance of a threadless tractive drive mechanism.

Coefficient of traction can be defined as the ratio of tangential force to normal load. The upper limiting value occurs at slip which is observed when rolling contact is on the verge of gross slip.

The present invention comprises a testing device for determining coefficient of traction under practical operating conditions by employing principles herein set forth and a process employing said device for preparing a tractive fluid of desired coefficient of traction from two or more fluids of different coefficients of traction.

Previous devices for testing coefficient of traction have not been completely satisfactory. Furthermore they have not been applicable to controlling the composition of a traction fluid composed of two or more fluids of different coefficients of traction.

W. C. Hammann et al. describe three coefficient of traction devices in "Synthetic Fluids for High Capacity Traction Drives" in American Society of Lubrication Engineers' Preprint 69LC-10, and ASLE/ASME Lubrication Conference, Houston, Texas, October 14–16, 1969.

A testing device referred to by Hammann et al. is described in U.S. Pat. No. 2,045,555, issued June 23, 1936, J. O. Almen, and consists essentially of a loaded thrust bearing and a means for measuring torque. The device actually measures friction caused by the rolling of balls in their circular paths. This is not a true measurement of traction; one element is static, whereas in a traction drive two or more members are relatively rotatable.

The aforementioned article also describes a two-disc machine which measures coefficient of traction in terms of sliding velocity. Considerable computations and corrections must be applied to data from the two-disc machine to get values for coefficient of traction.

A research traction test machine is also mentioned by Hammann et al. but not described in detail. The device requires a two-gallon sample and several days of operating time.

None of the three aforementioned testing devices would lend itself to a process application wherein the composition of a traction fluid is monitored and controlled continuously.

A linear actuator for converting rotational motion to linear displacement, also known as a mechanical transducer, provides a basis for building the present testing device. Such linear actuators are commonly used on sliding doors, motion transfer devices, constant-force machine tool feeds, feeder-control equipment, etc. They employ a cylindrical shaft mounted in a frame or housing for rotation about its longitudinal axis and a rider or roller block supported for linear movement along the axis of the shaft by a plurality of rollers mounted on the rider and engaging the outer surface of the shaft. The rollers axes of rotation are disposed at an angle relative to the longitudinal axis of the drive shaft, and the surfaces of the rollers are urged into frictional engagement with the surface of the shaft so that, as the shaft turns, the rollers describe a helical path around the shaft to move the rider linearly along the axis of the shaft. The longitudinal component of force generated at the tractionably engaged rolling surfaces is herein called thrust force. For a given shaft size and speed of rotation, the rate of travel of the rider along the shaft is determined by the angle which the roller axes make with the shaft axis. Also, the thrust which the roller block is capable of exerting is governed by this angle between the roller axes and shaft axis, and by the pressure exerted between the rollers and the shaft.

SUMMARY OF THE INVENTION

As one embodiment, this invention provides an apparatus for testing traction fluids comprising:

a. a linear actuator in a housing with means for conducting liquids thereto and therefrom; said actuator being mounted on a smooth rotatable shaft, and b. means attached to said housing adapted to measure the thrust force generated by said actuator along said shaft.

As another embodiment, this invention provides a continuous process for preparing a traction fluid comprising a blend of at least two fluids of different traction coefficients subject to variation from time to time, which comprises:

a. blending streams of said two fluids in a ratio adapted to produce a blend having a selected traction coefficient;

b. passing at least a portion of the blend through a testing device as specified in the aforementioned embodiment;

c. measuring the thrust force developed within the testing device;

d. and altering the ratio of said streams as changes in their traction coefficient levels occur to maintain a constant thrust by the test device.

BRIEF DESCRIPTION OF THE DRAWINGS

In the accompanying drawings.

DESCRIPTION OF THE INVENTION

Figure 1:
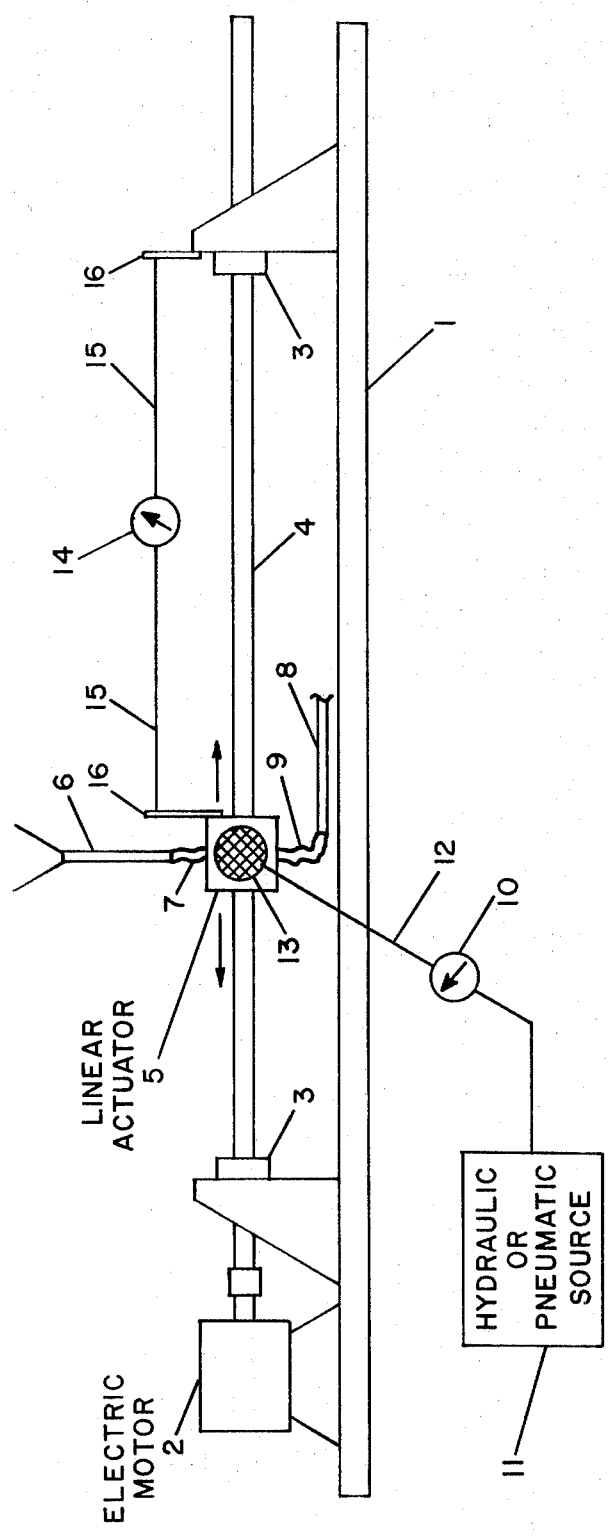
FIG. 1 is a schematic diagram of the testing device illustrating the relationship between linear actuator, supporting assembly, driving motor, fluid supply means and device to measure thrust force.

Referring to FIG. 1, an assembly comprising a mounting 1, an electric motor 2, a pair of bearings 3 and a smooth threadless drive shaft 4, support a linear actuator 5 and thrust measuring means 14, 15 and 16. The latter can be any suitable linear actuator such as those described by the following:

| Patent Number | Inventor |
|---|---|
| 3,473,393 | W. Zaruba |
| 3,638,504 | W. Zaruba |
| Re. 27,403 | W. Zaruba |
| 3,475,972 | J. P. Steibal |
| 3,272,021 | M. N. Weber |

Any other smooth shaft linear actuator can be employed. Sample fluid to be tested passes through conduit 6 and a flexible connector 7 to the linear actuator 5. The sample is withdrawn from the actuator through flexible connector 9 and conduit 8. The pitch of rollers within the actuator is fixed at a predetermined value of about 10°. To develop a thrust force, the pressure load on rolling elements within the actuator is fixed at a predetermined value, as indicated by gauge 10, by means of an external hydraulic or pneumatic source 11 acting through conduit 12 on diaphragm coverplate 13. The thrust force in pounds developed along the drive shaft axis due to traction between shaft and rolling elements contained within actuator 5 is measured by instrument 14 which is attached between actuator 5 and mounting 1 by connector 15 with bracket 16. This assembly also prevents the linear actuator from rotating on the shaft 4. In operation, a small continuous stream of fluid is introduced into line 6 while drive shaft 4 is in rotation.

Thrust force is measured when slippage occurs between rollers and shaft within the actuator thus giving rise to a measure of traction coefficient.

In making measurement of thrust in the aforementioned test device, pitch on the rollers was set at 10°, pressure from external sources on 1-3/16 inches rollers was fixed at 90 psig for a 1 ¼ inch shaft operating at 660 RPM. Mean compressive stress between shaft and rollers for tractive devices is generally in the range of 100,000 to 400,000 psi. The stress under the foregoing conditions was calculated to be 250,000 psi according to the expression:

$$0.410 \sqrt[3]{WE^2 (d_2 + d_1)^2/d_2 d_1} *$$

Where
 $W$ = pressure on rollers
 $E$ = Young's modulus of elasticity
 $d_1$ = diameter of rollers
 $d_2$ = effective diameter of shaft
 corrected for 10° pitch

* Analysis and Lubrication of Bearings, Shaw and Macks McGraw Hill Book Co., 1949, p. 402.

Other values for pitch and pressure may be employed and are not excluded from the scope of this invention.

Fluids of known traction coefficients were tested in the present invention to establish a relationship between thrust force at slip and coefficient of traction. Results are shown in the accompanying table.

TABLE

RELATIONSHIP BETWEEN THRUST FORCE AND COEFFICIENT OF TRACTION

| Fluid | Fluid Designation in U.S. 3,608,385 | Coefficient of Traction | Thrust Force, lbs at slip** |
|---|---|---|---|
| Perhydro-ortho-terphenyl | B | .050 | 37 |
| Perhydrogenated poly α-methyl styrene | 5 | .049 | 37 |
| Hydrogenated poly α-methyl styrene/polybutene, 50/50 | 10 | .048 | 33 |
| Hydrogenated polybutene | 23 | .044 | 30 |
| ASTM oil No. 3 (naphthenic) | 35 | .042 | 27 |
| Hydrogenated polyoctene | 46 | .029 | 24 |
| Hydrogenated ethylene-propylene copolymer oil | 44 | .026 | 22 |

* Values at 1000 ft/min, 200°F, 500,000 psi as reported by Duling et al. in U.S. Pat. 3,608,385, September 28, 1971.
** For 10° pitch, 250,000 psi at rollers, 660 RPM shaft speed.

Figure 2:
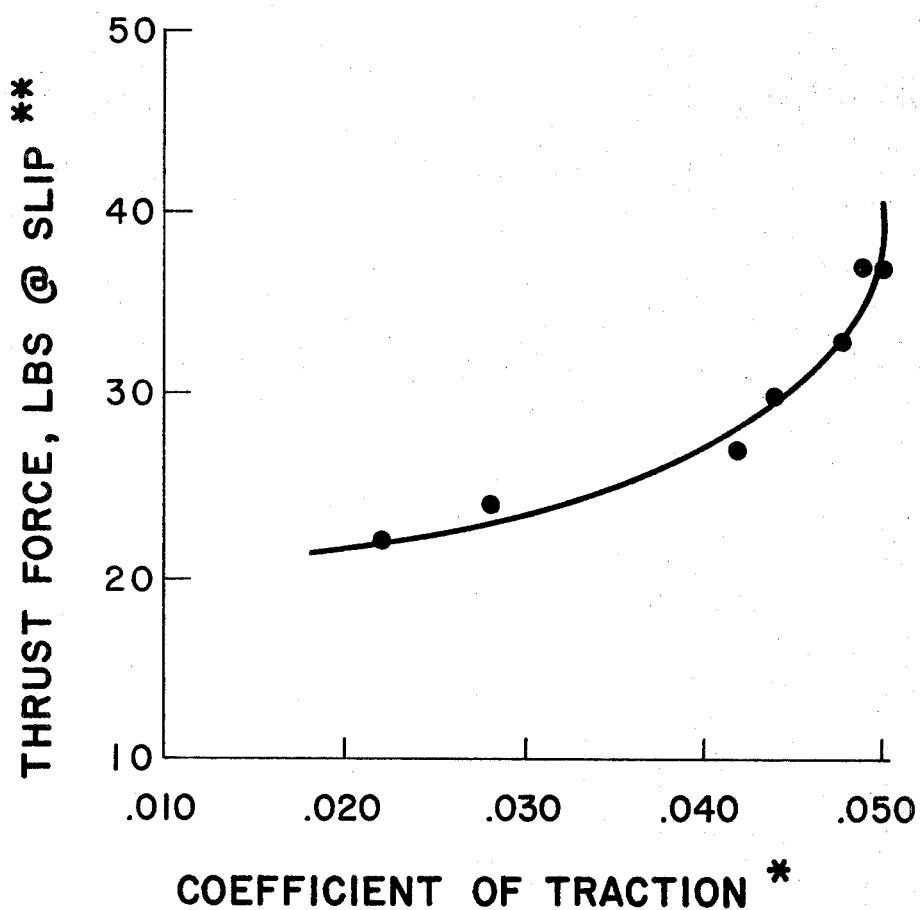
FIG. 2 is a graphical illustration of the relationship between thrust force at slip and coefficient of traction for selected fluids.

Inspection of the Table and its graphical representation in FIG. 2 illustrate the significant relationship between thrust force at slip as utilized by this invention and coefficient of traction for fluids of similar viscosities as measured under ambient conditions.

Figure 3:
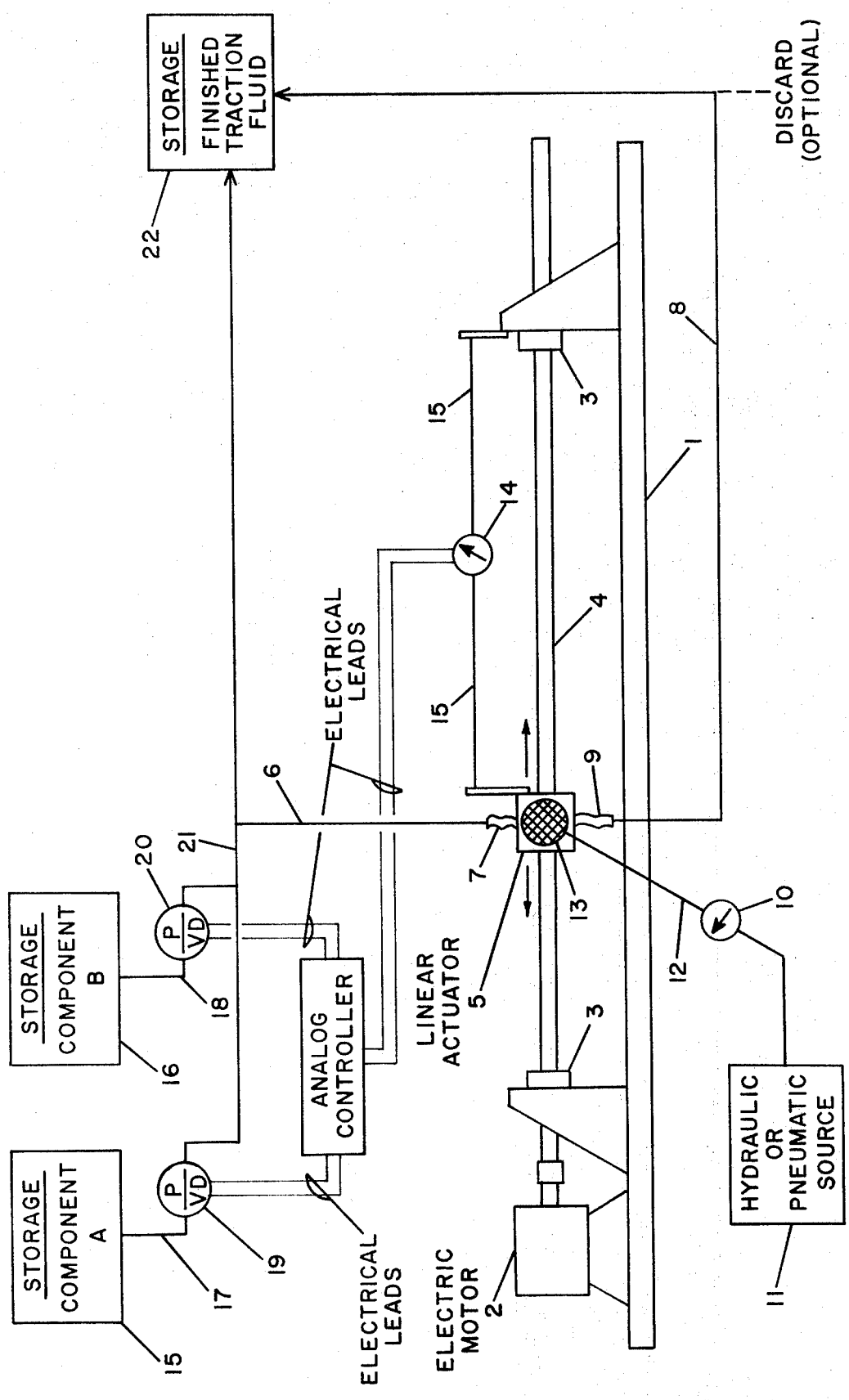
FIG. 3 is a schematic illustration of a system for operating a continuous process for blending two components of different traction coefficients, wherein the testing device is used to control the ratio of two components to maintain the traction coefficient of the finished blend at a desired level.

As another embodiment of this invention, the testing apparatus herein disclosed is employed in a continuous process for monitoring and controlling the preparation of a tractive fluid from at least two components of different traction coefficients. Referring to FIG. 3 starting fluids having different coefficients of traction are supplied from containers 15 and 16. Fluids are withdrawn respectively through lines 17 and 18 by variable speed positive displacement pumps 19 and 20. Other suitable flow control devices are not excluded from the scope of this invention. Mixing occurs in line 21 while fluids are enroute to storage tank 22. A small sample stream is withdrawn through line 6 and monitored continuously in the test device according to this invention. The intensity of thrust force, at slip, is converted to an electrical signal by any conventional means. One such signal may be generated by a differential transformer. The signal, which is proportional to thrust force, is fed into a conventional analog controller, which amplifies the signal, compares said signal with one of a predetermined value and uses the differential signal to alter the speed of either pump 19 or 20 appropriately. The signal of predetermined value is proportional to the coefficient of traction for the finished product. Any deviation in generated signal from the predetermined value causes the necessary corrective changes in the ratio of the fluid components. Tested sample is passed from the testing device through line 8 and sent to storage tank 21 or discarded.

To avoid excessive wear of rolling elements within the linear actuator during long periods of testing, it may be desirable to change the mean compressive stress to some value less than 250,000 psi and vary the pitch to some angle other than 10°. When used as a process control, provisions are made for recalibrating the testing device periodically and replacing worn rollers.

The invention claimed is:

1. An apparatus for testing liquid traction fluids comprising:
   a. a linear actuator in a housing having means for conducting said liquid traction fluids thereto and therefrom, said actuator being mounted on a smooth rotatable driveshaft axially thereof, means in the actuator for conducting said fluids between said actuator and said drive shaft; and
   b. means attached to said housing adapted to measure the thrust force generated by movement of said actuator along said drive shaft.

2. An apparatus for testing liquid traction fluids comprising:
   a. a variable pitch linear actuator in a housing having means for conducting said liquid traction fluids thereto and therefrom; said actuator having roller members mounted on a smooth rotatable drive shaft; and having means for applying pressure to the rolling members of said actuator: means in the actuator for conducting said liquid traction fluids between the actuator and said roller members; and
   means attached to said housing adapted to measure the thrust force generated by axial movement of said actuator along said drive shaft.

3. An apparatus according to claim 2 also including means for recording said thrust force.

* * * * *